United States Patent
Hong

(10) Patent No.: US 11,941,992 B2
(45) Date of Patent: Mar. 26, 2024

(54) METHOD AND APPARATUS FOR REPORTING FLIGHT PATH INFORMATION, AND METHOD AND APPARATUS FOR DETERMINING INFORMATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(\*) Notice: Subject to any disclaimer, the term of this patent is extended or adjusted under 35 U.S.C. 154(b) by 695 days.

(21) Appl. No.: 17/087,093

(22) Filed: Nov. 2, 2020

(65) Prior Publication Data
US 2021/0074167 A1    Mar. 11, 2021

Related U.S. Application Data

(63) Continuation of application No. PCT/CN2018/086359, filed on May 10, 2018.

(51) Int. Cl.
*G08G 5/00* (2006.01)
*B64C 39/02* (2023.01)
(Continued)

(52) U.S. Cl.
CPC .......... *G08G 5/0013* (2013.01); *B64C 39/024* (2013.01); *G01C 21/20* (2013.01);
(Continued)

(58) Field of Classification Search
CPC .............. H04B 7/18506; H04B 17/382; H04B 7/18504; H04B 17/24; H04B 17/391;
(Continued)

(56) References Cited

U.S. PATENT DOCUMENTS 9,797,983 B1   10/2017 Bitra et al.
11,638,257 B2 \* 4/2023 Määttanen ............ H04W 24/10
                                                            455/431
(Continued)

FOREIGN PATENT DOCUMENTS

CN           1997204 A    7/2007
CN         103517314 A    1/2014
(Continued)

OTHER PUBLICATIONS

3GPP TSG-RAN WG2 #99 Agenda 9.4.4, Nokia, Potential Mobility Enhancements for UAVs, 1-2 (Year: 2017).\*
(Continued)

*Primary Examiner* — Matthew C Sams
(74) *Attorney, Agent, or Firm* — Syncoda LLC; Feng Ma

(57) ABSTRACT

A method for reporting flight path information includes: determining content of flight path information of an unmanned aerial vehicle (UAV) including at least one of a path positioning point of the UAV, the flight speed of the UAV and the flight altitude of the UAV, the reporting time of the flight path information of the UAV, and the position and altitude of the UAV when the flight path information of the UAV is reported; and reporting, through radio resource control (RRC) signalling, the flight path information of the UAV to the base station. By determining the content of the flight path information of the UAV, and reporting the flight path information of the UAV to the base station by means of RRC signalling, the base station can determine flight-related information according to the content so as to prepare for handover in advance.

2 Claims, 12 Drawing Sheets

(51) Int. Cl.
   *G01C 21/20* (2006.01)
   *G05D 1/00* (2006.01)
   *G05D 1/10* (2006.01)
   *H04W 4/44* (2018.01)
   *H04W 36/32* (2009.01)

(52) U.S. Cl.
   CPC .............. *G05D 1/101* (2013.01); *H04W 4/44* (2018.02); *H04W 36/32* (2013.01); *B64U 2201/20* (2023.01)

(58) Field of Classification Search
   CPC .............. H04B 7/0617; H04B 7/18502; H04B 7/18508; H04B 7/18517; H04B 7/18519; H04B 7/18541; G05D 1/0022; G05D 1/101; G05D 1/0011; G05D 1/10; G08G 5/003; G08G 5/0069; G08G 5/0013; G08G 5/0082; G08G 5/0034; G08G 5/006; G08G 5/0017; G08G 5/0039; H04W 24/10; H04W 36/32; H04W 76/27; H04W 36/0058; H04W 4/029; H04W 64/006; H04W 72/21; H04W 72/51; H04W 76/19; H04W 84/02; H04W 88/02; H04W 24/02; H04W 24/08; H04W 28/0215; H04W 28/0226; H04W 36/0005; H04W 36/0016; H04W 36/0033; H04W 36/0061; H04W 36/0083; H04W 36/00835; H04W 36/00837; H04W 36/0088; H04W 36/0094; H04W 36/08; H04W 36/18; H04W 36/30; H04W 4/024; H04W 4/027; H04W 4/40; H04W 4/42; H04W 4/44; H04W 48/08; H04W 68/00; H04W 68/005; H04W 72/23; H04W 72/542; H04W 76/10; H04W 76/18; H04W 76/22; H04W 76/30; H04W 8/02; H04W 8/08; H04W 8/10; H04W 8/18; H04W 8/22; H04W 84/005; H04W 88/08; H04W 92/02; H04W 92/10; G08C 17/02; G08C 2201/50; G08C 2201/91; G08C 2201/93; B64C 39/024; B64C 39/02; B64U 2101/20
   See application file for complete search history.

(56) References Cited

U.S. PATENT DOCUMENTS

| | | |
|---|---|---|
| 2012/0034917 A1 | 2/2012 | Kazmi |
| 2013/0039308 A1 | 2/2013 | Lee |
| 2016/0142936 A1* | 5/2016 | Bressanelli ............. H04L 12/00 370/242 |
| 2017/0025021 A1 | 1/2017 | Song et al. |
| 2018/0247544 A1* | 8/2018 | Mustafic ........... H04W 36/0083 |
| 2019/0077508 A1* | 3/2019 | Shimezawa ............ H04B 17/24 |
| 2019/0180633 A1 | 6/2019 | Yoshizawa et al. |
| 2019/0254105 A1* | 8/2019 | Kim ....................... H04W 76/27 |
| 2020/0077415 A1* | 3/2020 | Tang ..................... G08G 5/0069 |
| 2020/0288370 A1* | 9/2020 | Mok ...................... H04W 36/30 |
| 2020/0404555 A1* | 12/2020 | Ökvist ............. H04W 36/0061 |
| 2021/0134165 A1 | 5/2021 | Yoshizawa et al. |
| 2022/0053506 A1* | 2/2022 | Matsuki ............... G05D 1/0022 |

FOREIGN PATENT DOCUMENTS

| | | | | |
|---|---|---|---|---|
| CN | 103874150 A | 6/2014 | | |
| CN | 103974327 A | 8/2014 | | |
| CN | 104053197 A | 9/2014 | | |
| CN | 105007115 A | 10/2015 | | |
| CN | 107205225 A | 9/2017 | | |
| CN | 108700895 A | * 10/2018 | ............. | B64C 39/02 |
| CN | 109196793 A | * 1/2019 | ........... | B64C 39/024 |
| CN | 109196794 A | * 1/2019 | ........... | G08G 5/0034 |
| CN | 109314898 A | * 2/2019 | ........... | B64C 39/024 |
| CN | 109417802 A | * 3/2019 | ........... | G05D 1/0022 |
| JP | 2017520197 A | 7/2017 | | |
| KR | 20140033221 A | 3/2014 | | |
| WO | 2013025031 A1 | 2/2013 | | |
| WO | 2017040974 A1 | 3/2017 | | |
| WO | 2017185106 A1 | 10/2017 | | |
| WO | 2018019394 A1 | 2/2018 | | |
| WO | WO-2018019394 A1 | * 2/2018 | ........... | G05D 1/0005 |
| WO | 2018042927 A1 | 3/2018 | | |
| WO | 2018061502 A1 | 4/2018 | | |
| WO | WO-2018061502 A1 | * 4/2018 | ............. | B64C 39/02 |

OTHER PUBLICATIONS

3GPP TSG-RAN WG2 #99bis, Agenda 9.4.4, Lenovo, Consideration for potential mobility enhancement for aerial UE, 1-6 (Year: 2017).*
Partial Supplementary European Search Report in the European application No. 18918289.2, dated Mar. 22, 2021.
First Office Action of the Korean application No. 10-2020-7035223, dated Jan. 17, 2022.
First Office Action of the Russian application No. 2020140047, dated Jun. 18, 2021.
Supplementary European Search Report in European application No. 18918289.2, dated Jun. 22, 2021.
First Office Action of the Japanese application No. 2020-563564, dated Oct. 25, 2021.
International Search Report in the international application No. PCT/CN2018/086359, dated Jan. 18, 2019.
English translation of the Written Opinion of the International Search Authority in the international application No. PCT/ CN2018/086359, dated Jan. 21, 2019.
First Office Action of the Chinese application No. 201880000629.2, dated May 13, 2019.
Notice of Allowance of the Japanese application No. 2020-563564, dated Sep. 20, 2022.
First Office Action of the Chinese application No. 202110260864.7, dated Sep. 23, 2022.

* cited by examiner

METHOD AND APPARATUS FOR REPORTING FLIGHT PATH INFORMATION, AND METHOD AND APPARATUS FOR DETERMINING INFORMATION

CROSS-REFERENCE TO RELATED APPLICATION

This is a continuation of International Application No. PCT/CN2018/086359 filed on May 10, 2018, the disclosure of which is hereby incorporated by reference in its entirety.

BACKGROUND

Unmanned Aerial Vehicles (UAVs) may include unmanned aircraft operated by radio remote control devices and/or self-contained program control apparatuses. An UAV can also refer generally to unmanned aircraft, and can include, for example, unmanned fixed wing aircraft, unmanned vertical takeoff and landing aircraft (VTOL), unmanned airships, unmanned helicopters, unmanned multi rotor aircraft, unmanned parasol aircraft, etc.

SUMMARY

The present disclosure relates generally to the technical field of communications, and more specifically to a method and an apparatus for reporting flight path information, a method and apparatus for determining information, a base station, an unmanned aerial vehicle, and a computer-readable storage medium.

Various embodiments of the present disclosure provide a method and apparatus for reporting flight path information, a method and apparatus for determining information, a base station, an Unmanned Aerial Vehicle (UAV), and a computer-readable storage medium, so as to determine content of the flight path information to be reported by a cellular network UAV, so that a base station determines flight-related information according to the content, so as to prepare for handover in advance.

According to a first aspect of the embodiments of the present disclosure, a method for reporting flight path information is provided, which is applied to an Unmanned Aerial Vehicle (UAV), and the method includes:
   determining content of the flight path information of the UAV, wherein the content includes at least one of the following: a path positioning point of the UAV, a flight speed of the UAV, a flight altitude of the UAV, a reporting time of the flight path information of the UAV, or a position and altitude of the UAV when the flight path information of the UAV is reported; and
   reporting the flight path information of the UAV to a base station by means of radio resource control (RRC) signalling.

In some embodiments, the content further includes an indicating bit for indicating whether transmission of the flight path information of the UAV is completed, and the method further includes:
   sending part of the flight path information related to the base station to the base station when a transmission data amount of the flight path information of the UAV calculated according to the indicating bit is greater than a preset threshold value.

In some embodiments, the RRC signalling includes UE assistance information signalling or UE information response signalling.

According to a second aspect of the embodiments of the present disclosure, a method for determining information is provided, which is applied to a base station, and the method includes:
   receiving flight path information of an Unmanned Aerial Vehicle (UAV) reported by the UAV, wherein content of the flight path information of the UAV includes at least one of a path positioning point, a flight speed and a flight altitude of the UAV, a reporting time of the flight path information of the UAV, and a position and altitude of the UAV when the flight path information of the UAV is reported; and
   determining flight-related information according to the flight path information of the UAV, wherein the flight-related information includes at least one of a flight path of the UAV, an identification of a serving base station to which the UAV is to be handed over, or a handover duration.

In some embodiments, under a situation that the content of the flight path information of the UAV includes the path positioning point of the UAV, determining the flight-related information according to the flight path information of the UAV includes:
   determining the flight path of the UAV according to the flight path information of the UAV.

In some embodiments, under a situation that the content of the flight path information of the UAV includes the flight speed of the UAV and the position and altitude of the UAV when the flight path information of the UAV is reported, determining the flight-related information according to the flight path information of the UAV includes:
   determining the identification of the serving base station to which the UAV is to be handed over, and the handover duration according to the flight path information of the UAV.

In some embodiments, under a situation that the content of the flight path information of the UAV includes the flight altitude of the UAV, determining the flight-related information according to the flight path information of the UAV includes:
   determining the identification of the serving base station to which the UAV is to be handed over, according to the flight path information of the UAV.

In some embodiments, under a situation that the content of the flight path information of the UAV includes the flight speed of the UAV, the reporting time, and the position of the UAV when the flight path information of the UAV is reported, determining the flight-related information according to the flight path information of the UAV includes:
   determining a flight path after the UAV reports the flight path information of the UAV, according to the flight path information of the UAV.

According to a third aspect of the embodiments of the present disclosure, an apparatus for reporting flight path information is provided, which is applied to an Unmanned Aerial Vehicle (UAV), and the apparatus includes:
   a determining portion configured to determine content of flight path information of the UAV, wherein the content includes at least one of the following: a path positioning point of the UAV, a flight speed of the UAV, a flight altitude of the UAV, a reporting time of the flight path information of the UAV, or a position and altitude of the UAV when the flight path information of the UAV is reported; and a reporting portion configured to report the flight path information of the UAV determined by the determining portion to a base station by means of radio resource control (RRC) signalling.

In some embodiments, the content further includes an indicating bit for indicating whether transmission of the flight path information of the UAV is completed, and the apparatus further includes:

a sending portion configured to send part of the flight path information related to the base station to the base station, in response to that a transmission data amount of the flight path information of the UAV counted according to the indicating bit is greater than a preset threshold value.

In some embodiments, the RRC signalling includes UE assistance information signalling or UE information response signalling.

According to a fourth aspect of the embodiments of the present disclosure, an apparatus for determining information is provided, which is applied to a base station, and the apparatus includes:

a receiving portion configured to receive flight path information of an Unmanned Aerial Vehicle (UAV) reported by the UAV, wherein content of the flight path information of the UAV includes at least one of the following: a path positioning point of the UAV, a flight speed of the UAV, a flight altitude of the UAV, a reporting time of the flight path information of the UAV, or a position and altitude of the UAV when the flight path information of the UAV is reported; and an information determining portion configured to determine flight-related information according to the flight path information of the UAV received by the receiving portion, wherein the flight-related information includes at least one of a flight path of the UAV, an identification of a serving base station to which the UAV is to be handed over, or a handover duration.

In some embodiments, under a situation that the content of the flight path information of the UAV includes the path positioning point of the UAV, the information determining portion includes:

a first determining subportion configured to determine the flight path of the UAV according to the flight path information of the UAV.

In some embodiments, under a situation that the content of the flight path information of the UAV includes the flight speed of the UAV, and the position and the altitude of the UAV when the flight path information of the UAV is reported, the information determining portion includes:

a second determining subportion configured to determine the identification of the serving base station to which the UAV is to be handed over, and the handover duration according to the flight path information of the UAV.

In some embodiments, under a situation that the content of the flight path information of the UAV includes the flight altitude of the UAV, the information determining portion includes:

a third determining subportion configured to determine the identification of the serving base station to which the UAV is to be handed over, according to the flight path information of the UAV.

In some embodiments, under a situation that the content of the flight path information of the UAV includes the flight speed of the UAV, the reporting time, and the position of the UAV when the flight path information of the UAV is reported, the information determining portion includes:

a fourth determining subportion configured to determine a flight path after the UAV reports the flight path information of the UAV, according to the flight path information of the UAV.

According to a fifth aspect of the embodiments of the present disclosure, an Unmanned Aerial Vehicle (UAV) is provided, including:

a processor; and memory for storing instructions executable by the processor;

wherein the processor is configured to:

determine content of the flight path information of the UAV, wherein the content includes at least one of the following: a path positioning point of the UAV, a flight speed of the UAV, a flight altitude of the UAV, a reporting time of the flight path information of the UAV, or a position and altitude of the UAV when the flight path information of the UAV is reported; and report the flight path information of the UAV to a base station by means of radio resource control (RRC) signalling.

According to a sixth aspect of the embodiments of the present disclosure, a base station is provided, including:

a processor; and memory for storing instructions executable by the processor;

wherein the processor is configured to:

receive flight path information of an Unmanned Aerial Vehicle (UAV) reported by the UAV, wherein content of the flight path information of the UAV includes at least one of the following: a path positioning point of the UAV, a flight speed of the UAV, a flight altitude of the UAV, a reporting time of the flight path information of the UAV, or a position and altitude of the UAV when the flight path information of the UAV is reported; and determine flight-related information according to the flight path information of the UAV, wherein the flight-related information includes at least one of a flight path of the UAV, an identification of a serving base station to which the UAV is to be handed over, or a handover duration.

According to a seventh aspect of the embodiments of the present disclosure, a computer readable storage medium is provided, which has computer instructions stored thereon, the computer instructions, when executed by a processor, implement the steps of the above method for reporting the flight path information.

According to an eighth aspect of the embodiments of the present disclosure, a computer readable storage medium is provided, which has computer instructions stored thereon, the computer instructions, when executed by a processor, implement the steps of the above method for determining the information.

It should be understood that the above general description and the following detailed description are exemplary and explanatory only, and are not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
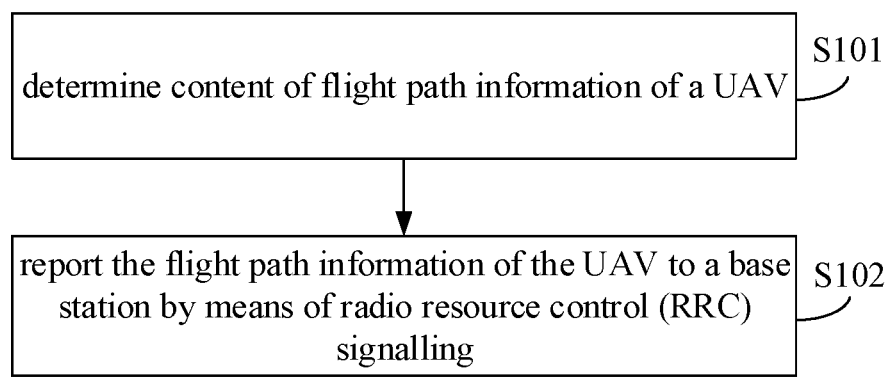
FIG. 1 is a flowchart of a method for reporting flight path information illustrated in some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

With rapid development, cost reduction and improvement of functions of the UAV technologies, UAVs are increasingly used in all aspects of life. At present, application of UAVs in the fields of aerial photography, agriculture, plant protection, micro self-photography, express transportation, disaster rescue, wildlife observation, infectious disease monitoring, surveying and mapping, news reporting, power inspection, disaster relief, film and television image capturing, scene creating and the like greatly expands self-use of the UAVs, and each country is actively expanding the industry application and developing the UAV technology.

In order to further expand the application scope of UAVs, the 3rd Generation Partnership Project (3GPP) has approved the project of Enhanced Support for Aerial Vehicles, aiming at studying and standardizing the project of enabling cellular networks to provide UAVs with services that meet various demands.

There are generally two flight modes for UAVs. One of them is a fixed mode, that is, an operator plans a flight path of a UAV on a controller, so that the UAV can fly according to the planned path, and the controller does not have to control the UAV all the time. As for the fixed mode, since the flight path and trajectory of the UAV are fixed, the cellular network can predict which cellular network base stations the UAV will pass through. However, the content of the flight path information of the cellular network UAV needs to be further determined.

FIG. 1 is a flowchart of a method for reporting flight path information illustrated in some embodiments of the present disclosure, the embodiment is described from the UAV side, and as illustrated in FIG. 1, the method for reporting the flight path information includes the following steps.

In block S101, content of the flight path information of a UAV is determined, wherein the content includes at least one of the following: a path positioning point of the UAV, a flight speed of the UAV, a flight altitude of the UAV, a reporting time of the flight path information of the UAV, or a position and altitude of the UAV when the flight path information of the UAV is reported.

In some embodiments, the content of the flight path information of the UAV may at least one of the following: a path positioning point of the UAV, a flight speed of the UAV, a flight altitude of the UAV, a reporting time of the flight path information of the UAV, or a position and altitude of the UAV when the flight path information of the UAV is reported, wherein the path positioning point of the UAV may be Global Positioning System (GPS) coordinates. The flight altitude refers to a flight altitude set when the UAV is in the coverage area of a base station, for example, the flight altitude set in the coverage area of a base station 1 is 100 meters, and the flight altitude set in the coverage area of a base station 2 is 200 meters. The altitude of the UAV when the flight path information of the UAV is reported refers to the altitude of the UAV at the time point of reporting the flight path information of the UAV, for example, if the UAV is located in the coverage of the base station 2 when the flight path information of the UAV is reported, then the altitude of the UAV when the flight path information of the UAV is reported is 200 meters.

In addition, the content of the flight path information of the UAV may further include an indicating bit for indicating whether transmission of the flight path information of the UAV is completed.

In block S102, the flight path information of the UAV is reported to a base station by means of radio resource control (RRC) signalling.

The RRC signalling may be, but not limited to, UE assistance information (UEAssistanceInformation) signalling or UE information response (UEInformationResponse) signalling, etc.

In some embodiments, if the content of the flight path information of the UAV includes the indicating bit for indicating whether transmission of the flight path information of the UAV is completed, the UAV sends part of the flight path information related to a current serving base station to the current serving base station when transmission data amount of the flight path information of the UAV calculated by the UAV according to the indicating bit is greater than a preset threshold value. That is, if the flight path of the UAV is relatively long, the number of bits of the flight path information to be reported may be relatively large, the UAV may merely inform the current serving base station of a certain or several sections of the flight path information related to the current serving base station, so as to reduce the transmission data amount and reduce the system energy consumption.

In the above embodiment, the content of the flight path information of the UAV is determined, and the flight path information of the UAV is reported to the base station by means of the RRC signalling, so that the base station can determine the flight-related information through the content, so as to prepare for handover in advance.

Figure 2:
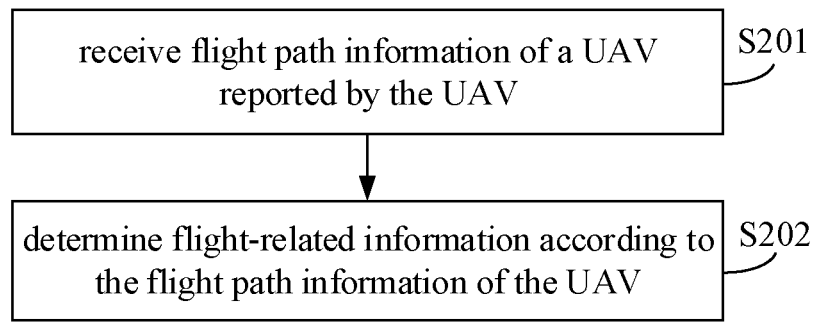
FIG. 2 is a flowchart of a method for determining information illustrated in some embodiments of the present disclosure.

FIG. 2 is a flowchart of signalling of a method for determining information illustrated in some embodiments of the present disclosure, the embodiment is described from the base station side, and as illustrated in FIG. 2, the method includes the following steps.

In block S201, the flight path information of the UAV reported by the UAV is received, wherein content of the flight path information of the UAV includes at least one of a path positioning point, a flight speed and a flight altitude of the UAV, a reporting time of the flight path information of the UAV, and a position and altitude of the UAV when the flight path information of the UAV is reported.

In block S202, flight-related information is determined according to the flight path information of the UAV, wherein the flight-related information includes at least one of a flight path of the UAV, a to-be-switched service base station identification and a to-be-switched duration.

the flight path of the UAV includes a flight path after the UAV reports the flight path information of the UAV.

In some embodiments, when the content of the flight path information of the UAV includes the path positioning point of the UAV, the base station can determine the flight path of the UAV according to the flight path information of the UAV. When the content of the flight path information of the UAV includes the flight speed of the UAV, and the position and the altitude of the UAV when the flight path information of the UAV is reported, the base station can determine the to-be-switched service base station identification and the to-be-switched duration according to the flight path information of the UAV. When the content of the flight path information of the UAV includes the flight altitude of the UAV, the base station can determine the to-be-switched service base station identification according to the flight path information of the UAV. When the content of the flight path information of the UAV includes the flight speed of the UAV, the reporting time, and the position of the UAV when the flight path information of the UAV is reported, the base station can determine the flight path after the UAV reports the flight path information of the UAV according to the flight path information of the UAV.

In the above embodiment, the flight path information of the UAV reported by the UAV is received, and the flight-related information is determined according to the flight path information of the UAV so as to prepare for handover in advance.

Figure 3:
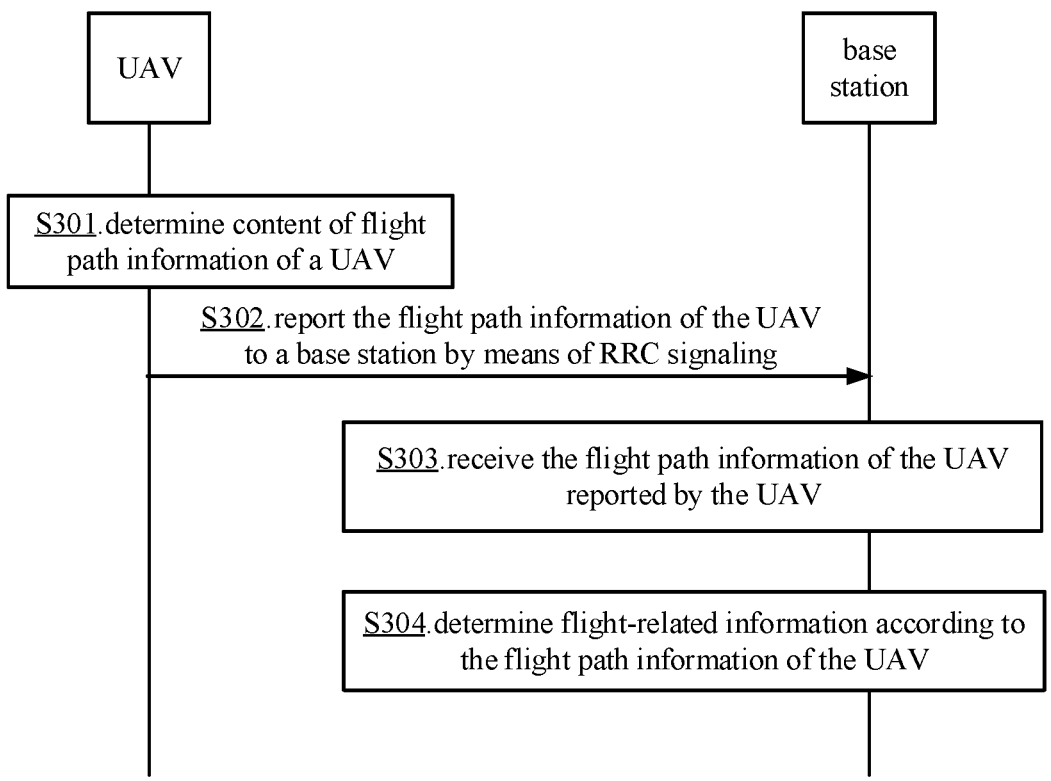
FIG. 3 is a signalling flowchart of a method for determining information illustrated in some embodiments of the present disclosure.

FIG. 3 is a flowchart of signalling of a method for determining information illustrated in some embodiments of the present disclosure, the embodiment is described from a perspective of interaction between the base station and the UAV, and as illustrated in FIG. 3, the method includes the following steps.

In block S301, content of flight path information of the UAV is determined by the UAV, wherein the content includes at least one of the following: a path positioning point of the UAV, a flight speed of the UAV, a flight altitude of the UAV, a reporting time of the flight path information of the UAV, or a position and altitude of the UAV when the flight path information of the UAV is reported.

In block S302, the flight path information of the UAV is reported by the UAV to a base station by means of radio resource control (RRC) signalling.

In block S303, the flight path information of the UAV reported by the UAV is received by the base station.

In block S304, flight-related information is determined by the base station according to the flight path information of the UAV, wherein the flight-related information includes at least one of a flight path of the UAV, an identification of a serving base station to which the UAV is to be handed over, or a handover duration.

In the above embodiment, through the interaction between the base station and the UAV, the base station can determine the flight-related information through the flight path information of the UAV reported by the UAV, so as to prepare for handover in advance.

Figure 4:
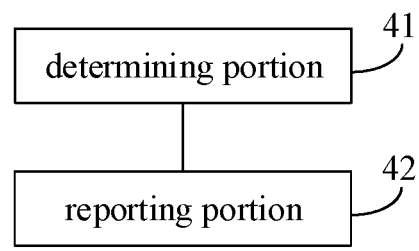
FIG. 4 is a block diagram of an apparatus for reporting flight path information illustrated in some embodiments of the present disclosure.

FIG. 4 is a block diagram of an apparatus for reporting flight path information illustrated in some embodiments of the present disclosure, the apparatus may be located in the UAV, and as illustrated in FIG. 4, the apparatus includes a determining portion 41 and a reporting portion 42.

The determining portion 41 is configured to determine content of flight path information of the UAV, wherein the content includes at least one of the following: a path positioning point of the UAV, a flight speed of the UAV, a flight altitude of the UAV, a reporting time of the flight path information of the UAV, or a position and altitude of the UAV when the flight path information of the UAV is reported.

In some embodiments, the content of the flight path information of the UAV may include at least one of the following: a path positioning point of the UAV, a flight speed of the UAV, a flight altitude of the UAV, a reporting time of the flight path information of the UAV, or a position and altitude of the UAV when the flight path information of the UAV is reported, wherein the path positioning point of the UAV may be Global Positioning System (GPS) coordinates.

In addition, the content of the flight path information of the UAV may further include an indicating bit for indicating whether transmission of the flight path information of the UAV is completed.

The reporting portion 42 is configured to report the flight path information of the UAV determined by the determining portion 41 to a base station by means of radio resource control (RRC) signalling.

The RRC signalling may be, but not limited to, UE assistance information signalling or UE information response signalling, etc.

In the above embodiment, the content of the flight path information of the UAV is determined, and the flight path information of the UAV is reported to the base station by means of the RRC signalling, so that the base station can determine the flight-related information according to the content, so as to prepare for handover in advance.

Figure 5:
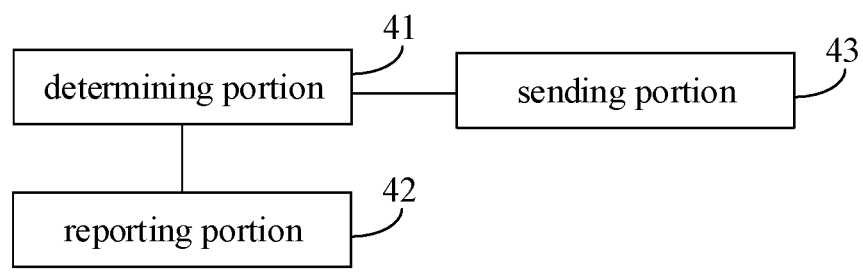
FIG. 5 is a block diagram of another apparatus for reporting flight path information illustrated in some embodiments of the present disclosure.

FIG. 5 is a block diagram of another apparatus for reporting flight path information illustrated in some embodiments of the present disclosure, in the embodiment, the content of the flight path information of the UAV may further include an indicating bit for indicating whether transmission of the flight path information of the UAV is completed, and as illustrated in FIG. 5, on the basis of the embodiment illustrated in FIG. 4, the apparatus may further include a sending portion 43.

The sending portion 43 is configured to send part of the flight path information related to the base station to the base station when transmission data amount of the flight path information of the UAV calculated according to the indicating bit is greater than a preset threshold value.

In some embodiments, if the content of the flight path information of the UAV includes the indicating bit for indicating whether transmission of the flight path information of the UAV is completed, part of the flight path information related to a current serving base station is sent to the current serving base station when the transmission data amount of the flight path information of the UAV calculated by the UAV according to the indicating bit is greater than a preset threshold value. That is, if the flight path of the UAV is relatively long, the to-be-reported number of bits of the flight path information may be relatively large, the UAV may merely inform the current serving base station of a certain or several sections of the flight path information related to the current serving base station, so as to reduce the transmission data amount and reduce the system energy consumption.

In the above embodiment, part of the flight path information related to the base station is sent to the base station when transmission data amount of the flight path information of the UAV calculated according to the indicating bit is greater than a preset threshold value, so that the transmission data amount is reduced, and the system energy consumption is reduced.

Figure 6:
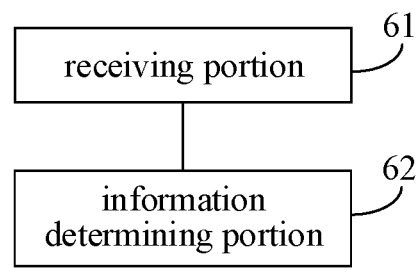
FIG. 6 is a block diagram of an apparatus for determining information illustrated in some embodiments of the present disclosure.

FIG. 6 is a block diagram of an apparatus for determining information illustrated in some embodiments of the present disclosure, the apparatus may be located in a base station, and as illustrated in FIG. 6, the apparatus includes: a receiving portion 61 and an information determining portion 62.

The receiving portion 61 is configured to receive flight path information of the UAV reported by the UAV, wherein content of the flight path information of the UAV includes at least one of the following: a path positioning point of the UAV, a flight speed of the UAV, a flight altitude of the UAV, a reporting time of the flight path information of the UAV, or a position and altitude of the UAV when the flight path information of the UAV is reported.

The information determining portion 62 is configured to determine flight-related information according to the flight path information of the UAV received by the receiving portion, wherein the flight-related information includes at least one of a flight path of the UAV, an identification of a serving base station to which the UAV is to be handed over, or a handover duration.

A flight path of the UAV includes a flight path after the UAV reports the flight path information of the UAV.

In some embodiments, when the content of the flight path information of the UAV includes the path positioning point of the UAV, the base station may determine the flight path of the UAV according to the flight path information of the UAV. When the content of the flight path information of the UAV includes the flight speed of the UAV, and the position and altitude of the UAV when the flight path information of the UAV is reported, the base station may determine the to-be-switched service base station identification and the to-be-switched duration according to the flight path information of the UAV. When the content of the flight path information of the UAV includes the flight altitude of the UAV, the base station may determine an identification of a serving base station to which the UAV is to be handed over according to the flight path information of the UAV. When the content of the flight path information of the UAV includes the flight speed of the UAV, the reporting time, and the position of the UAV when the flight path information of the UAV is reported, the base station may determine the flight path after the UAV reports the flight path information of the UAV according to the flight path information of the UAV.

In the above embodiment, the flight path information of the UAV reported by the UAV is received, and the flight-related information is determined according to the flight path information of the UAV, so as to prepare for handover in advance.

Figure 7:
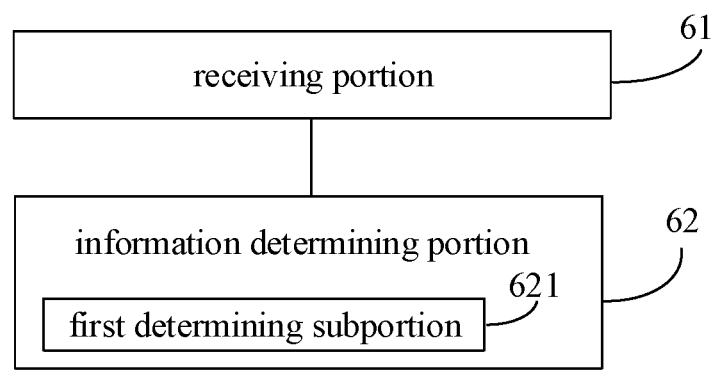
FIG. 7 is a block diagram of another apparatus for determining information illustrated in some embodiments of the present disclosure.

FIG. 7 is a block diagram of another apparatus for determining information illustrated in some embodiments of the present disclosure, and as illustrated in FIG. 7, on the basis of the embodiment illustrated in FIG. 6, when the content of the flight path information of the UAV includes the path positioning point of the UAV, the information determining portion 62 may include a first determining subportion 621.

The first determining subportion 621 is configured to determine the flight path of the UAV according to the flight path information of the UAV.

In some embodiments, when the content of the flight path information of the UAV includes the path positioning point of the UAV, the base station may determine the flight path of the UAV according to the flight path information of the UAV.

In the above embodiment, the flight path of the UAV is determined according to the flight path information of the UAV so as to facilitate the corresponding operation according to the flight path.

Figure 8:
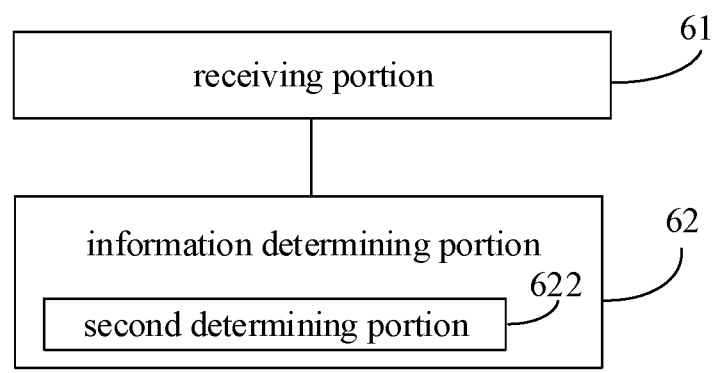
FIG. 8 is a block diagram of another apparatus for determining information illustrated in some embodiments of the present disclosure.

FIG. 8 is a block diagram of another apparatus for determining information illustrated in some embodiments of the present disclosure, and as illustrated in FIG. 8, on the basis of the embodiment illustrated in FIG. 6, when the content of the flight path information of the UAV includes the flight speed of the UAV, the reporting time of the flight path information of the UAV, and the position and the altitude of the UAV when the flight path information of the UAV is reported, the information determining portion 62 may include:

a second determining subportion 622, configured to determine an identification of a serving base station, to which the UAV is to be handed over, and a handover duration according to the flight path information of the UAV.

In the above embodiment, the identification of the serving base station, to which the UAV is to be handed over, and the handover duration are determined according to the flight path information of the UAV, so as to prepare for handover in advance.

Figure 9:
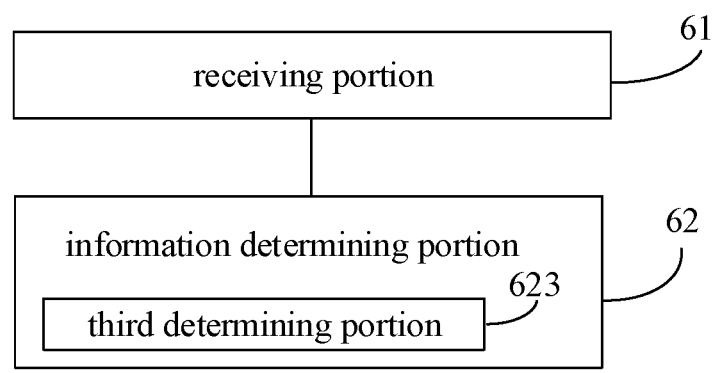
FIG. 9 is a block diagram of another apparatus for determining information illustrated in some embodiments of the present disclosure.

FIG. 9 is a block diagram of another apparatus for determining information illustrated in some embodiments of the present disclosure, and as illustrated in FIG. 9, on the basis of FIG. 6, when the content of the flight path information of the UAV includes the flight altitude of the UAV, the information determining portion may include a third determining subportion 623.

The third determining subportion 623 is configured to determine identification of the serving base station, to which the UAV is to be handed over, according to the flight path information of the UAV.

In the above embodiment, the identification of the serving base station, to which the UAV is to be handed over, is determined according to the flight path information of the UAV, so as to prepare for handover in advance.

Figure 10:
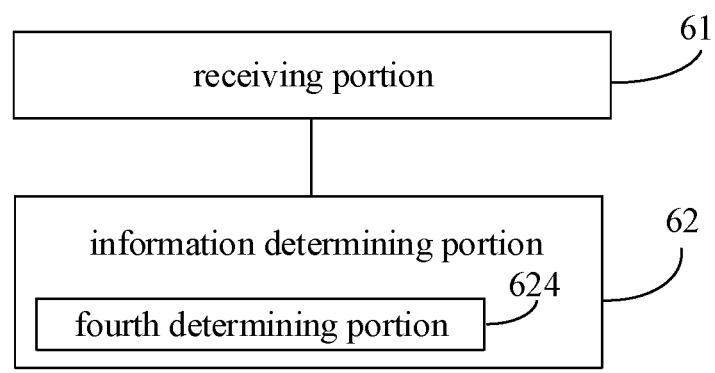
FIG. 10 is a block diagram of another apparatus for determining information illustrated in some embodiments of the present disclosure.

FIG. 10 is a block diagram of another apparatus for determining information illustrated in some embodiments of the present disclosure, and as illustrated in FIG. 10, on the basis of the embodiment illustrated in FIG. 6, when the content of the flight path information of the UAV includes the flight speed of the UAV, the reporting time, and the position of the UAV when the flight path information of the UAV is reported, the information determining portion 62 may include a fourth determining subportion 624.

The fourth determining subportion 624 is configured to determine a flight path after the UAV reports the flight path information of the UAV, according to the flight path information of the UAV.

In the above embodiment, the flight path after the UAV reports the flight path information of the UAV is determined according to the flight path information of the UAV so as to facilitate the corresponding operation according to the flight path.

Figure 11:
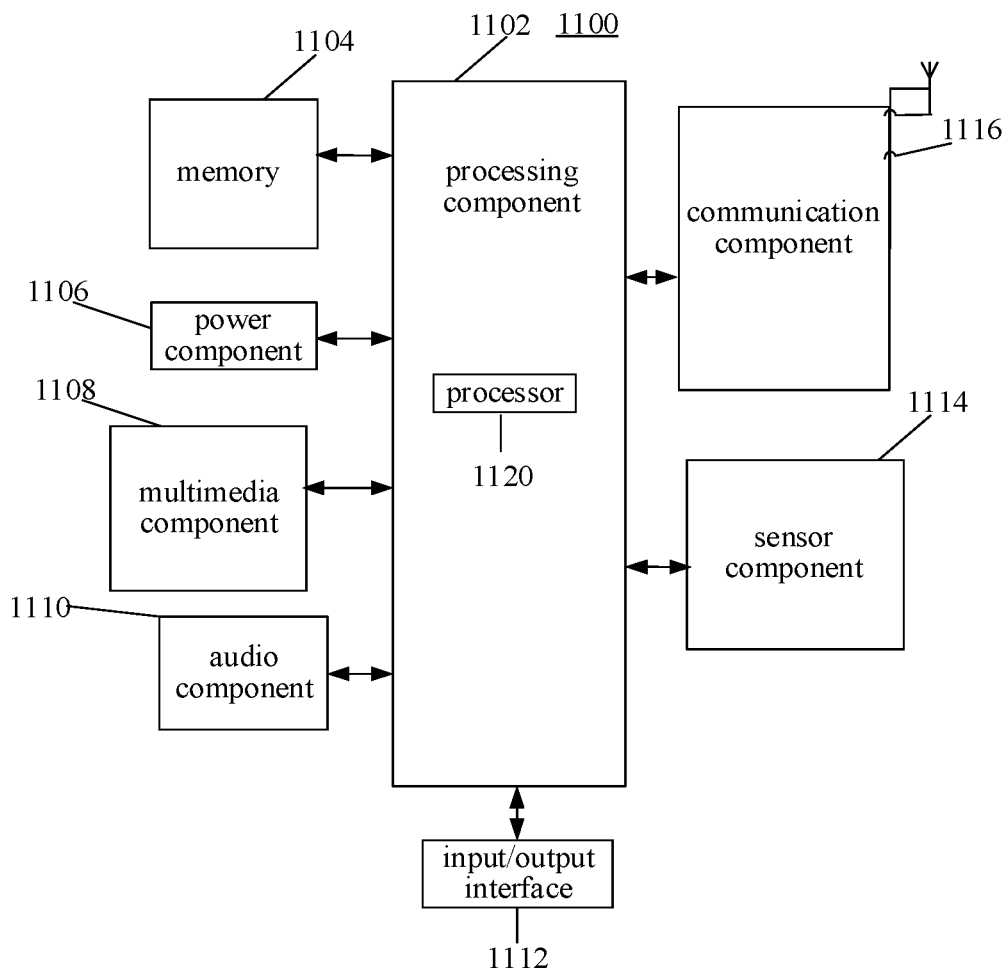
FIG. 11 is a block diagram of an apparatus suitable for reporting flight path information illustrated in some embodiments of the present disclosure.

FIG. 11 is a block diagram of an apparatus suitable for reporting flight path information illustrated in some embodiments of the present disclosure. For example, the apparatus 1100 may be user equipment such as a mobile phone, a computer, a digital broadcasting terminal, messaging equipment, a game console, tablet equipment, medical equipment, fitness equipment, and a UAV.

Referring to FIG. 11, the apparatus 1100 may include one or more following components: a processing component 1102, memory 1104, a power component 1106, a multimedia component 1108, an audio component 1110, an input/output (I/O) interface 1112, a sensor component 1114, and a communication component 1116.

The processing component 1102 generally controls overall operations of the apparatus 1100, such as operations related to displaying, telephone calls, data communications, camera operations, and recording operations. The processing component 1102 may include one or more processors 1120 to execute instructions, so as to complete all or part of the steps of the method described above. In addition, the processing component 1102 may include one or more modules to facilitate the interaction between the processing component 1102 and other components. For example, the processing component 1102 may include a multimedia module to facilitate interaction between the multimedia component 1108 and the processing component 1102.

One of the processors 1120 of the processing component 1102 may be configured to:
determine content of the flight path information of the UAV, wherein the content includes at least one of the following: a path positioning point of the UAV, a flight speed of the UAV, a flight altitude of the UAV, a reporting time of the flight path information of the UAV, or a position and altitude of the UAV when the flight path information of the UAV is reported; and
report the flight path information of the UAV to a base station by means of radio resource control (RRC) signalling.

The memory 1104 is configured to store various types of data to support the operation of the apparatus 1100. Examples of such data include instructions for any application program or method operated on the apparatus 1100, contact data, phone book data, messages, pictures, videos, and the like. The memory 1104 may be implemented by any type of volatile or non-volatile storage apparatuses or a combination thereof, such as an Electrically Erasable Programmable Read-Only Memory (EEPROM), a Programming Read-Only Memory (EPROM), a Programmable Read-Only Memory (PROM), a Read-Only Memory (ROM), a magnetic memory, a flash memory, a magnetic disk or an optical disk.

The power component 1106 provides power for various components of the apparatus 1100. The power component 1106 may include a power management system, one or more power supplies, and other components associated with generating, managing, and distributing power for the apparatus 1100.

The multimedia component 1108 includes a screen providing an output interface between the apparatus 1100 and a user. In some embodiments, the screen may include a Liquid Crystal Display (LCD) and a Touch Panel (TP). In some embodiments, organic light-emitting diode (OLED) or other types of displays can be employed. If it includes the TP, the screen may be implemented as a touch screen to receive an input signal from a user. The TP includes one or more touch sensors to sense touch, swipe, and gestures on the TP. The touch sensors may not only sense a boundary of a touch or swipe action, but also detect a time of duration and a pressure associated with the touch or swipe action. In some embodiments, the multimedia component 1108 includes a front camera and/or a rear camera. The front camera and/or the rear camera may receive external multimedia data while the apparatus 1100 is in an operation mode, such as a photographing mode or a video mode. Each front camera and each rear camera may be fixed optical lens systems or may have focal lengths and optical zoom capabilities.

The audio component 1110 is configured to output and/or input audio signals. For example, the audio component 1110 includes a microphone (MIC), and the microphone is configured to receive an external audio signal when the apparatus 1100 is in an operation mode, such as a calling mode, a recording mode, and a voice identification mode. The received audio signals may be further stored in the memory 1104 or transmitted via the communication component 1116. In some embodiments, the audio component 1110 may further include a speaker to output audio signals.

The I/O interface 1112 provides an interface between the processing component 1102 and peripheral interface modules, which may be keyboards, click wheels, buttons, etc. These buttons may include, but not limited to: a home button, a volume button, a start button, and a lock button.

The sensor component 1114 includes one or more sensors configured to provide state assessment of various aspects for the apparatus 1100. For example, the sensor component 1114 may detect an on/off status of the apparatus 1100, and relative positioning of components. For example, the components are a display and a keypad of the apparatus 1100. The sensor component 1114 may also detect a change in position of the apparatus 1100 or a component of the apparatus 1100, presence or absence of a user being in contact with the apparatus 1100, an orientation or an acceleration/deceleration of the apparatus 1100, and a change in temperature of the apparatus 1100. The sensor component 1114 may include a proximity sensor configured to detect the presence of objects nearby without any physical contact. The sensor component 1114 may also include light sensors, such as CMOS or CCD image sensors, for use in imaging disclosures. In some embodiments, the sensor component 1114 may also include an acceleration sensor, a gyroscope sensor, a magnetic sensor, a pressure sensor, or a temperature sensor.

The communication component 1116 is configured to facilitate wired or wireless communications between the apparatus 1100 and other apparatuses. The apparatus 1100 may access a wireless network based on a communication standard, such as Wi-Fi, 2G, 3G, 4G, or 5G, or a combination thereof. In some embodiments of the present disclosure, the communication component 1116 receives a broadcast signal or broadcast related information from an external broadcast management system via a broadcast channel. In one exemplary embodiment, the communication component 1116 further includes a Near Field Communication (NFC) module to promote short-range communications. For example, the NFC module may be implemented based on a Radio Frequency Identification (RFID) technology, an Infrared Data Association (IrDA) technology, an Ultra-Wide Band (UWB) technology, a Bluetooth (BT) technology and other technologies.

In some embodiments, the apparatus 1100 may be implemented by one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components to perform the above method.

In some embodiments, a non-transitory computer-readable storage medium including an instruction, such as memory 1104 including an instruction, is further provided. The instruction may be executed by a processor 1120 of an apparatus 1100 to complete the above method. For example, the non-transitory computer readable storage medium may be a Read Only Memory (ROM), a Compact Disc Read-Only Memory (CD-ROM), a magnetic tape, a floppy disc, an optical data storage apparatus, and the like.

Figure 12:
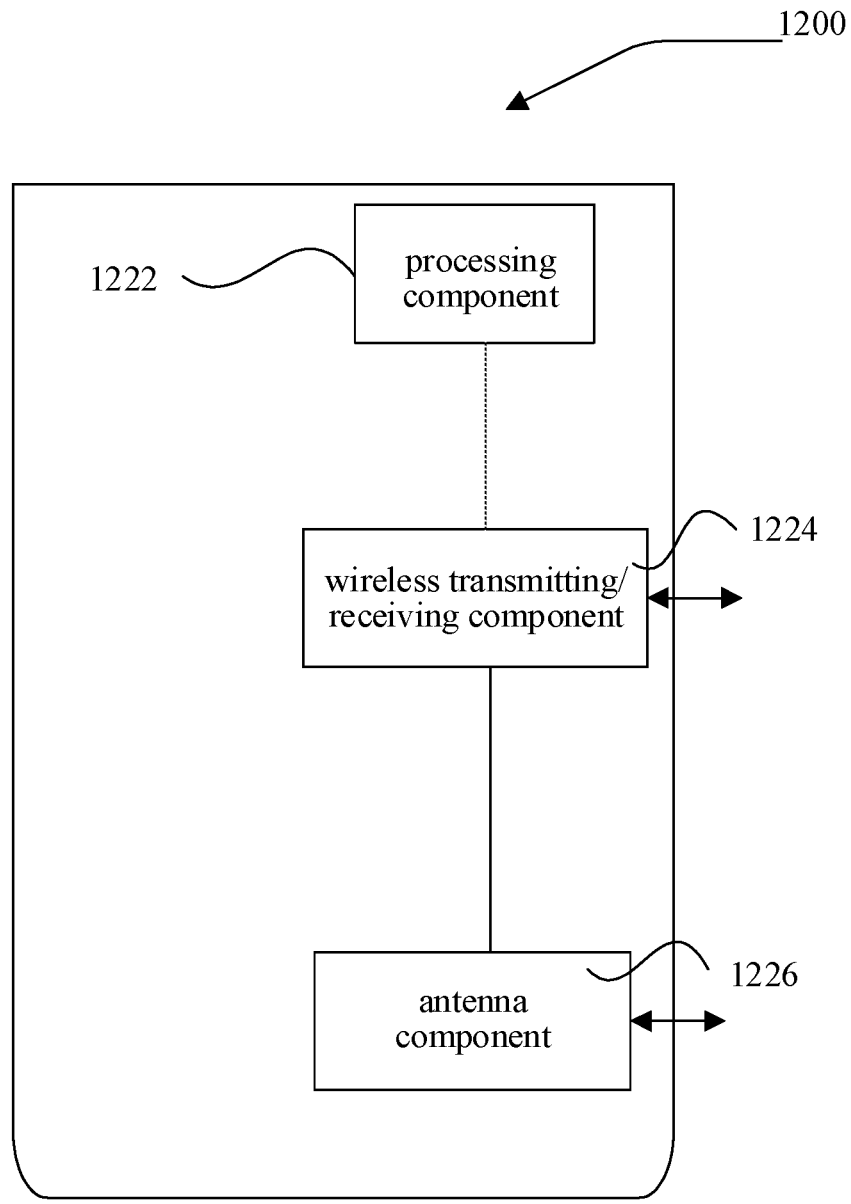
FIG. 12 is a block diagram of an apparatus suitable for determining information illustrated in some embodiments of the present disclosure.

FIG. 12 is a block diagram of an apparatus suitable for determining information illustrated in some embodiments of the present disclosure. The apparatus 1200 may be provided as a base station. Referring to FIG. 12, the apparatus 1200 includes a processing component 1222, a wireless transmitting/receiving component 1224, an antenna component 1226 and a specific signal processing part of a wireless interface, and the processing component 1222 may further include one or more processors.

One of the processors of the processing component 1222 may be configured to:
    receive flight path information of the UAV reported by the UAV, wherein content of the flight path information of the UAV includes at least one of the following: a path positioning point of the UAV, a flight speed of the UAV, a flight altitude of the UAV, a reporting time of the flight path information of the UAV, or a position and altitude of the UAV when the flight path information of the UAV is reported; and
    determine flight-related information according to the flight path information of the UAV, wherein the flight-related information includes at least one of a flight path of the UAV, an identification of a serving base station to which the UAV is to be handed over, or a handover duration.

In some embodiments, a non-transitory computer-readable storage medium including instructions is further provided, and the above instructions may be executed by the processing component 1222 of the apparatus 1200 to implement the above method for determining information. For example, the non-transitory computer-readable storage medium may be a Read Only Memory (ROM), a Random Access Memory (RAM), a Compact Disc Read-Only Memory (CD-ROM), a magnetic tape, a floppy disc, an optical data storage apparatus, and the like.

For the apparatus embodiments, reference will now be made in part to the description of the method embodiments since they substantially correspond to the method embodiments. The apparatus embodiments described above are only schematic, wherein the units described as separate components may or may not be physically separated, and the components displayed as units may or may not be physical units, i.e., may be located in one place or may be distributed over multiple network units. Some or all of the modules can be selected according to actual needs to achieve the purpose of the scheme of the embodiments.

Various embodiments of the present disclosure can have one or more of the following advantages.

The content of the flight path information of the UAV is determined, and the flight path information of the UAV is reported to the base station by means of the RRC signalling, so that the base station can determine the flight-related information according to the content, so as to prepare for handover in advance.

The flight path information of the UAV reported by the UAV is received, and the flight-related information is determined according to the flight path information of the UAV, so as to prepare for handover in advance.

It should be noted that in this document, relational terms such as first and second, and the like are used solely to distinguish one entity or operation from another entity or operation without necessarily requiring or implying any such actual relationship or order between such entities or operations. The terms 'includes', 'including", or any other variations thereof, are intended to cover a non-exclusive inclusion, such that a process, method, article, or equipment that includes a list of elements not only includes those elements but also may include other elements not expressly listed or inherent to such process, method, article, or equipment. An element defined by the phrase 'includes one . . . ' does not, without more constraints, preclude the existence of additional identical elements in the process, method, article, or equipment that includes the element.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for reporting flight path information, applied to an unmanned aerial vehicle (UAV) and comprising:

determining content of the flight path information of the UAV, wherein the content comprises at least: a path positioning point of the UAV, a flight altitude of the UAV, and a reporting time of the flight path information of the UAV; and sending part of the flight path information related to a current serving base station to the current serving base station by UE information response field of radio resource control (RRC) signalling, in response to that a transmission data amount of the flight path information of the UAV is greater than a preset threshold value, wherein the transmission data amount is calculated according to the content of the flight path information that comprises an indicating bit for indicating whether the flight path information of the UAV to be transmitted is complete;

wherein the flight path information is planned flight path information, and the path positioning point of the UAV is a location of a planned fight path of the UAV.

2. An unmanned aerial vehicle (UAV), comprising:

a processor; and memory for storing instructions executable by the processor;

wherein the processor is configured to:
determine content of the flight path information of the UAV, wherein the content comprises: a path positioning point of the UAV, a flight altitude of the UAV and a reporting time of the flight path information of the UAV; and
send part of the flight path information related to a current serving base station to the current serving base station by UE information response field of radio resource control (RRC) signalling, in response to that a transmission data amount of the flight path information of the UAV is greater than a preset threshold value, wherein the transmission data amount is calculated according to the content of the flight path information that comprises an indicating bit for indicating whether the flight path information of the UAV to be transmitted is complete;
wherein the flight path information is planned flight path information, and the path positioning point of the UAV is a location of a planned fight path of the UAV.

* * * * *